(No Model.) 3 Sheets—Sheet 3.
C. SPRATT.
SPEED INDICATOR.
No. 568,046. Patented Sept. 22, 1896.
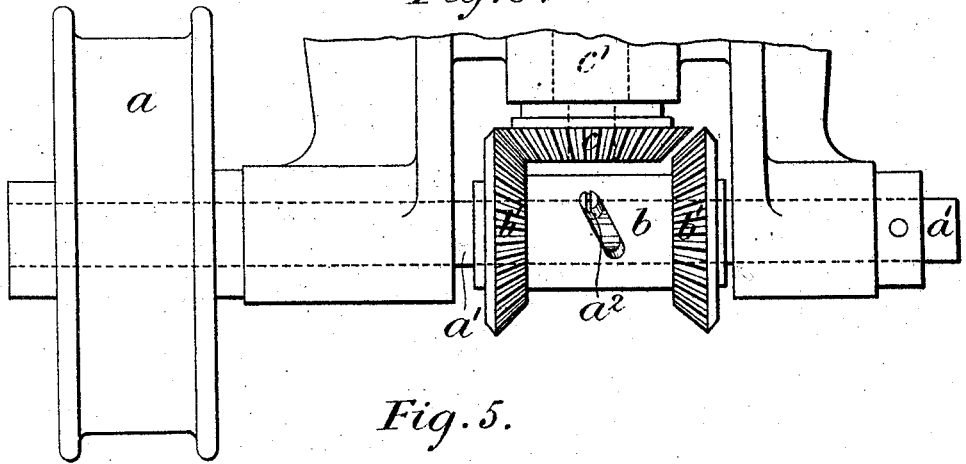
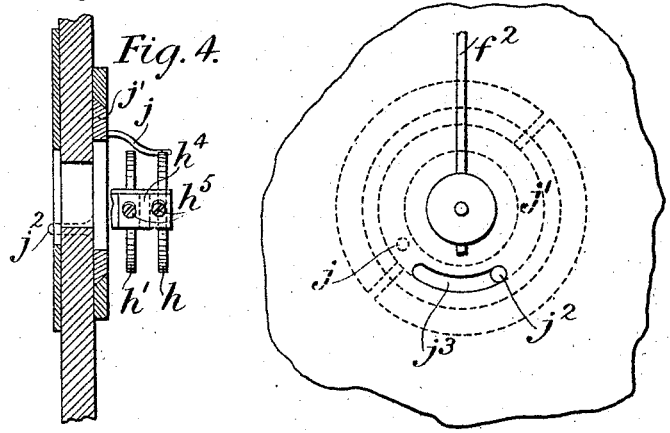
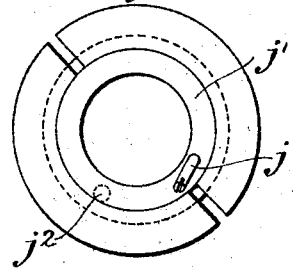
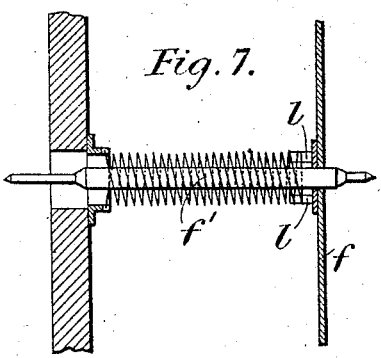
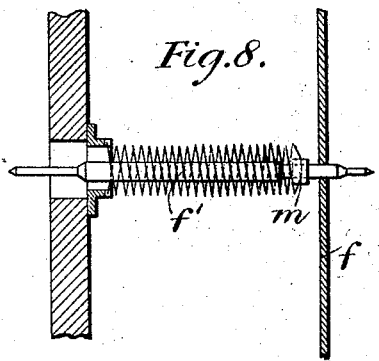
Witnesses
Guy E. Davis
B. W. Miller
Inventor
Charles Spratt
By his Attorneys
Baldwin Davidson & Wight

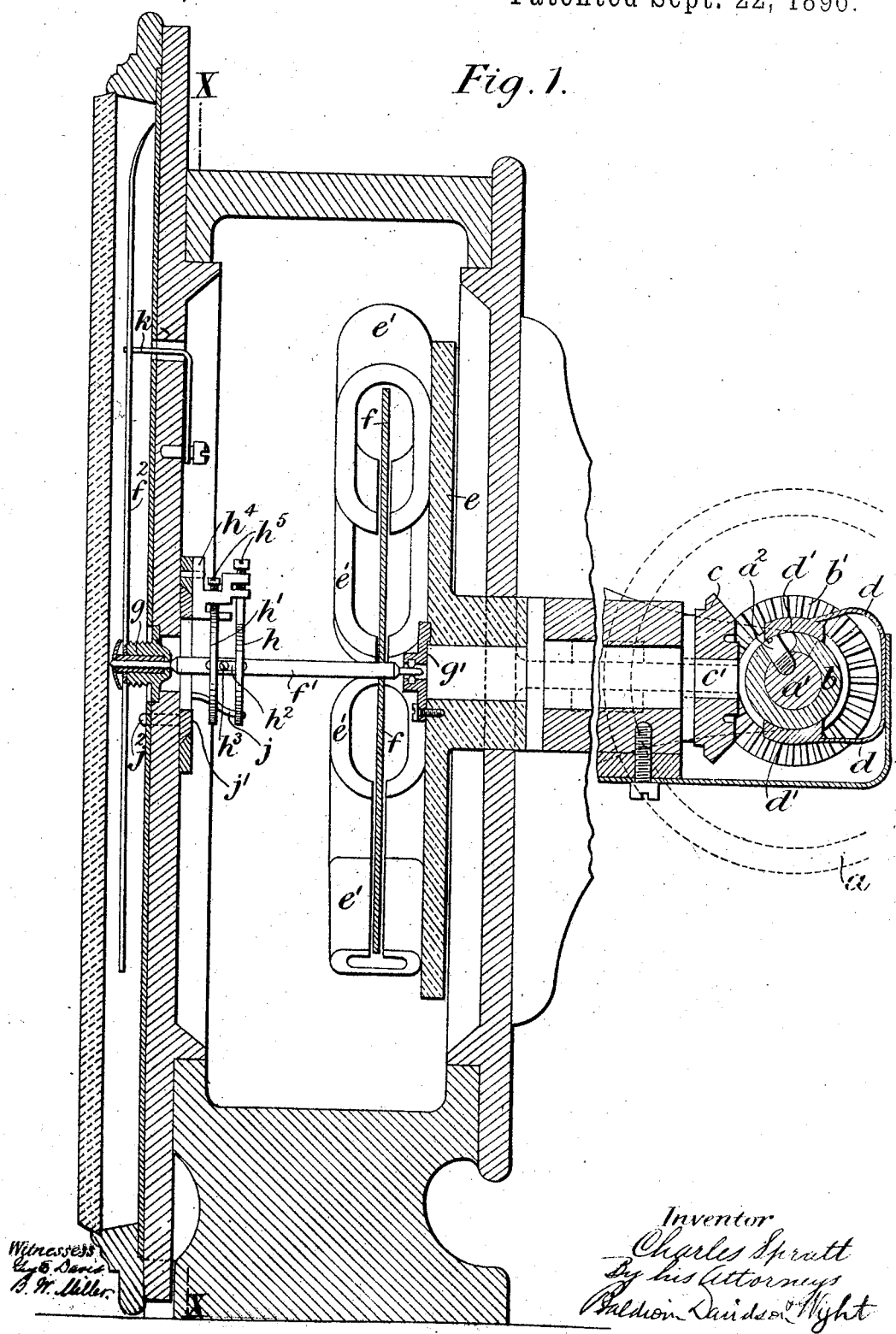

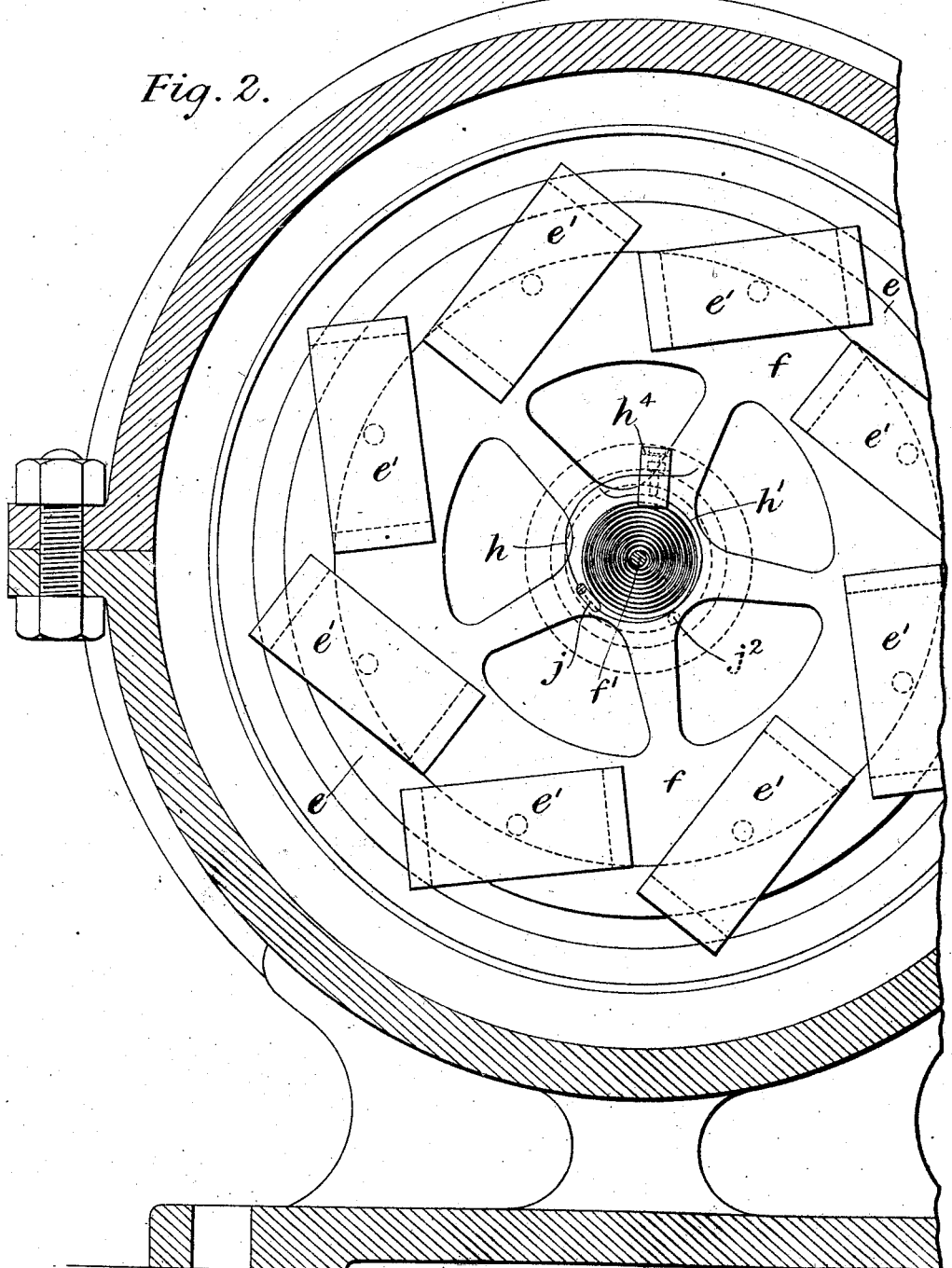

UNITED STATES PATENT OFFICE.

CHARLES SPRATT, OF LONDON, ENGLAND.

SPEED-INDICATOR.

SPECIFICATION forming part of Letters Patent No. 568,046, dated September 22, 1896.

Application filed December 23, 1895. Serial No. 573,102. (No model.)

*To all whom it may concern:*

Be it known that I, CHARLES SPRATT, electrician, a subject of the Queen of Great Britain, residing at 9 Erlanger Road, New Cross Gate, London, in the county of Kent, England, have invented a certain new and useful Speed-Indicator, of which the following is a specification.

This invention relates to instruments whose action depends on magnetic torque, such as speed-indicators, ships' logs, anemometers, trocheameters, or any other apparatus for the purpose of indicating the speed of revolution of any rotating body.

I have discovered that more accurate results are obtained by making the armature of manganin or similar metal, instead of the metals (generally copper) hitherto employed.

My improvements also relate to lessening the effects of friction in such instruments and to making their indicators move in the same direction, whether the driving-shaft is revolving forward or backward.

My speed-indicator is constructed in the following manner: Fixed upon the shaft whose speed is to be indicated is a wheel carrying on one side a number of magnets, which are preferably permanent horseshoe magnets. Parallel to and coaxial with the wheel is a manganin disk having its edge between the poles of the magnets, which point radially inward, or the edge of the disk may be turned inward and the magnet point outward. This disk can revolve about its axis, but in so doing winds up a helical spring, one end of which is fixed to its center, while the other end is fixed to the frame of the machine. As the wheel revolves the magnets tend to carry the disk with it; but it only turns until the tendency of the magnets to rotate it is exactly balanced by the resistance of the spring, and it then remains stationary so long as the speed of rotation of the wheel continues the same. The axis of the disk carries a hand or pointer which revolves over a properly-graduated scale, showing the speed of rotation of the wheel by the angle through which the disk has turned. Two helical springs are preferably employed, and their ends are secured to the disk by being simply passed through slots in two pins fixed in the same face near to and one on either side of its center, or the ends of the springs may be fixed to a square nut free to move along the square end of the axle. By this means a very steady action is obtained and the reading of the instrument is little affected by changes of temperature, as any expansion or contraction of the springs only causes their ends to move longitudinally.

In order to lessen the effect of friction on the motion of the disk, I form the bearing for one end of its spindle in the shaft or wheel, so that this bearing rotates while the other is fixed. The friction of one bearing therefore tends to accelerate the motion of the disk and that of the other to retard it, these tendencies more or less counteracting each other.

When it is desired to indicate the speed of the driving-shaft when reversed, the following device is adopted: The wheel carrying the magnets is not mounted upon the driving-shaft, but on a separate shaft, at whose end is fixed a bevel-pinion gearing with one or other of two bevel-wheels fixed on a sleeve on the driving-shaft. This sleeve has a diagonal slot in it which receives a pin fixed to the shaft. When the driving-shaft is moving in one direction, the pin is at one end of the slot and the corresponding bevel-wheel is in gear; but when the motion is reversed the pin travels to the other end of the slot, and the incline of the latter causes the sleeve to move longitudinally on the shaft, throwing the first-mentioned bevel-wheel out of gear and putting the other in, so that the magnets are always driven in the same direction. A light spring is provided bearing against the sleeve to prevent its being turned by friction when the pin is traveling in the slot.

Figure 1 is a central longitudinal section of a speed-indicator constructed according to this invention. Fig. 2 is a transverse section on the line X X, Fig. 1, and Fig. 3 is a plan of the right-hand end of Fig. 1. Fig. 4 is a sectional, Fig. 5 a left-hand, and Fig. 6 a right-hand, side elevation of a detail. Figs. 7 and 8 show modifications of the springs.

$a$ is the driving-pulley, and $a'$ its shaft, to which the pin $a^2$ is fixed. This pin works in an inclined slot in the sleeve $b$, whose ends carry beveled pinions $b'$ $b'$, one or other of which gears with the pinions $c$ on the shaft $c'$ $d$ are springs (omitted in Fig. 3) carrying friction-pads $d'$, bearing on the sleeve $b$. These prevent the sleeve $b$ from being carried round merely by the friction of the shaft $a'$ and insure the pin $a^2$ by its action on the incline putting one or other of the pinions $b'$ into gear with the pinion $c$. The shaft $c'$ carries a wheel $e$, to which are fixed horseshoe magnets $e'$, preferably arranged, as shown, so that they alternately have their north and south poles next to the wheel.

$f$ is a disk of manganin, (an alloy of eighty-four per cent. copper, twelve per cent. manganese, and four per cent. nickel being suitable.) It is an advantage when constructing a low-speed instrument to coat the manganin disk with a thin deposit of copper, as it gives greater magnetic torque and the temperature change only affects it slightly to what it does a solid copper disk. The disk $f$ is mounted on the shaft $f'$, which carries a hand or pointer $f^2$ and works in bearings $g$ $g'$. The bearing $g$ is fixed to the frame of the instrument and the bearing $g'$ to the shaft $c'$.

$h$ $h'$ are two spiral springs, each having one end fixed to the shaft $f'$ by being clipped between it and a plate $h^2$, secured by a screw $h^3$, while their other ends are fixed to the bracket $h^4$ on the frame of the instrument by the screws $h^5$.

The effective length of the spring $h$ can be adjusted by a regulator similar to that of a clock. It consists of an arm $j$, Figs. 1, 4, and 6, split at its end to embrace the spring and mounted on a plate $j'$, which can be turned by a pin $j^2$, projecting through a slot $j^3$ in the dial. $k$ is a spring-arm against which the hand $f^2$ strikes when it comes to the zero-point.

In place of the springs $h$ $h'$ above described helical springs may be employed, as shown at Figs. 7 and 8. One end of each is fixed to the frame, while the other ends are passed through slots in two pins $l$ $l$ on the disk $f$, as shown in Fig. 7, or to a square nut $m$ on the end of the shaft $f'$, which is squared to receive it, as shown in Fig. 8.

What I claim is—

1. A speed-indicator comprising a shaft carrying a series of magnets, adapted to be connected with an object, the speed of which is to be indicated, a spindle carrying a disk in proximity to said magnets, stationary bearings in which one end of the spindle is mounted, rotary bearings supporting the other end of the spindle, and speed-indicating devices operated by the spindle.

2. A speed-indicator comprising a spindle carrying a disk and indicating devices, a spring connecting the spindle with the frame of the instrument, a series of horseshoe magnets carried by a support rotating near the disk, said magnets having their poles, one on each side of the disk, the north poles of adjacent magnets being on opposite sides thereof, substantially as described.

3. The combination of a shaft driven from the part whose speed is to be indicated, a disk fixed to a spindle free to rotate in bearings, one fixed and the other carried by the shaft, a spring having one end fixed to the spindle, the other to the frame of the machine, an indicator carried by the spindle and horseshoe magnets carried by the shaft embracing the disk and having their poles one on each side of it, the north poles of adjacent magnets being on opposite sides of the disk.

4. The combination of a shaft driven from the part whose speed is to be indicated, a sleeve on the shaft, two beveled pinions fixed to the sleeve, an inclined slot in the sleeve, a pin fixed to the shaft and working in the slot, a second shaft carrying a beveled pinion gearing with one or other of the pinions on the sleeve, friction-pads bearing on the sleeve to prevent it from being carried around by the friction of the shaft, a disk fixed to a spindle free to rotate in bearings, a spring having one end fixed to the spindle the other to the frame of the machine, an indicator carried by the spindle and a magnet carried by the shaft and having one pole in proximity to the disk.

5. The combination of a shaft driven from the part whose speed is to be indicated, a sleeve on the shaft, two beveled pinions fixed to the sleeve, an inclined slot in the sleeve, a pin fixed to the shaft and working in the slot, a second shaft carrying a beveled pinion gearing with one or other of the pinions on the sleeve, a disk fixed to a spindle free to rotate in bearings, a spring having one end fixed to the spindle, the other to the frame of the machine, an indicator carried by the spindle and horseshoe magnets carried by the second shaft embracing the disk and having their poles one on each side of it.

6. The combination of a shaft driven from the part whose speed is to be indicated, a sleeve on the shaft, two beveled pinions fixed to the sleeve, an inclined slot in the sleeve, a pin fixed to the shaft and working in the slot, a second shaft carrying a beveled pinion gearing with one or other of the pinions on the sleeve, a disk fixed to a spindle free to rotate in bearings, a spring having one end fixed to the spindle the other to the frame of the machine, an indicator carried by the spindle and horseshoe magnets carried by the second shaft embracing the disk and having their poles one on each side of it, the north poles of adjacent magnets being on opposite sides of the disk.

7. The combination of a shaft driven from the part whose speed is to be indicated, a sleeve on the shaft, two beveled pinions fixed to the sleeve, an inclined slot in the sleeve, a pin fixed to the shaft and working in the slot, a second shaft carrying a beveled pinion gearing with one or other of the pinions on the sleeve, a disk fixed to a spindle free to rotate in bearings one fixed and the other carried by the second shaft, a spring having one end fixed to the spindle the other to the frame of the machine, an indicator carried by the spindle and horseshoe magnets carried by the second shaft embracing the disk and having their poles one on each side of it.

8. The combination of a shaft driven from the part whose speed is to be indicated, a sleeve on the shaft, two beveled pinions fixed to the sleeve, an inclined slot in the sleeve, a pin fixed to the shaft and working in the slot, a second shaft carrying a beveled pinion gearing with one or other of the pinions on the sleeve, a disk fixed to a spindle free to rotate in bearings, one fixed and the other carried by the second shaft, a spring having one end fixed to the spindle, the other to the frame of the machine, an indicator carried by the spindle and horseshoe magnets carried by the second shaft, embracing the disk and having their poles one on each side of it, the north poles of adjacent magnets being on opposite sides of the disk.

CHARLES SPRATT.

Witnesses:
S. B. STRINGER,
W. MORRIS.